Aug. 29, 1972 K. D. BROADBENT 3,687,664

DUPLICATING PROCESS FOR VIDEO DISC RECORDS

Filed July 24, 1968

INVENTOR.
Kent D. Broadbent
Jessup and Beecher
By Keith D. Beecher
ATTORNEYS 3,687,664

DUPLICATING PROCESS FOR VIDEO DISC RECORDS

Kent D. Broadbent, San Pedro, Calif., assignor to Gauss Electrophysics, Inc., Santa Monica, Calif.

Filed July 24, 1968, Ser. No. 747,337
Int. Cl. G03c 1/68, 5/16
U.S. Cl. 96—35.1 5 Claims

ABSTRACT OF THE DISCLOSURE

A duplicating process for forming disc records bearing optical recordings representative of video signals is provided. A transparent disc, formed for example of plastic or glass, has a surface coated with an appropriate opaque material, such as copper. The surface is then exposed to a monomer vapor, for example, which is selectively polymerized by electromagnetic radiation, such as X-rays or ultraviolet rays, etc., through a negative of the desired video recordings. This results in the polymerization on the coated surface of the disc of a hydrocarbon layer in the pattern of the video recordings of the negative. The portions of the coated surface which are not covered by the hydrocarbon layer are then etched off by a suitable etchant, such as chlorine gas, to provide a transparent pattern of holes in the opaque coating which are representative of the video recordings.

RELATED COPENDING APPLICATIONS

Ser. No. 507,474, filed Nov. 12, 1965 now abandoned; Ser. No. 627,701, filed Apr. 3, 1967, now U.S. Pat. No. 3,430,966; Ser. No. 741,020, now U.S. Pat. No. 3,530,258; Ser. No. 735,007; Ser. No. 747,251.

BACKGROUND OF THE INVENTION

A transparent plastic video record disc is described in copending application Ser. No. 627,701, now U.S. Pat. No. 3,430,966 in which picture information in the form of video signals is optically recorded on one or both sides of the disc. This optical recording extends along a spiral track on the surface of the disc, and it comprises a series of transparent holes or depressions along the track, with interposed opaque areas, the transparent holes having individual lengths representative of the recorded picture information.

The picture information recorded on the video record disc is intended to be reproduced, for example, through a home television receiver, or by other appropriate reproducing equipment. The reproduction is achieved by rotating the video record disc on a turntable and by directing a light beam through the disc, as described in copending application 507,474 now abandoned, of which U.S. Pat. No. 3,530,258 is a continuation-in-part. The light beam is modulated by the video recordings on the disc, and a pick-up head is provided which responds to the resulting light signals to transform the light signals into corresponding electrical video signals for playback purposes.

The present invention is concerned with a duplication process by which a multiplicity of such video record discs may be mass produced from a negative. In the prior art phonograph duplicating process, a "biscuit" of vinyl or other plastic material is placed in a "stamper," and a heated master record die is brought down into the surface of the biscuit. The plastic at the biscuit surface is melted and caused to flow radially into the spaced defined by the impressions on the master die surface. However, this stamping technique as it is now generally practiced does not appear to be suitable for the extremely fine micro-spiral grooves required for video frequency recording.

The process to be described herein, for example, is one in which a surface of a disc record is coated by a suitable material, such as copper, and the coated surface placed in contact wtih a suitable monomer vapor, and the vapor is irradiated selectively through a negative of the desired video recordings to cause it to polymerize on selected portions of the surface of the disc record so as to form a film on that surface bearing the video recordings of the negative in the form of holes in the film. As mentioned above, a suitable etch is then aplied to the film, and the portions of the coating which are not covered by the polymerized film are removed from the disc, as will be described. The films produced by such a process are capable of providing recording definitions well beyond the micro-requirements of the aforesaid video records. Moreover, the basic simplicity of the process makes it eminently suited for the production of video disc records on a mass production basis.

A polymer dielectric film may be formed on the coated surface of the disc, for example, by exposing the surface of the die to a monomer vapor and by photon irradiation of the exposed surface through a negative. For example, the formation of thin polymer films using three different monomers irradiated by ultraviolet energy from a mercury arc is described in an article by L. V. Gregor and H. L. McGee in "Proceedings of Electronbeam Symposium, Fifth Annual Meeting," March 28, 29, 1963. Other works describe the use of X-rays and gamma rays to polymerize monomer vapors onto surfaces exposed to such vapors.

One possible embodiment of the process of the invention, whereby a film is produced on the surface of a master die, involves a monomer vapor such as acrolein ($CH_2$=CH—CHO) in contact with the coated surface of the disc at a presure of several millimeters of mercury and subjecting the surface of the disc to ultraviolet radiations through the aforesaid negative. Once a sufficiently thick film is selectively polymerized on the surface of the disc, the portions of the coating not covered by the film may be etched away to produce a pattern of holes in the coating extending in a spiral track and representing the video recordings of the negative. A similar process may be applied to the opposite side of the disc for a two-sided video record.

When the aforesaid film is formed on the coated surface of the transparent disc, and when the uncovered portions of the coating have been etched away, the resulting disc exhibits an optically opaque surface with the aforesaid transparent holes in the opaque coating extending around a spiral recording track, the holes having varying lengths, as mentioned above, representative of the video intelligence.

BRIEF DESCRIPTIIN OF THE DRAWINGS

DETAILED DESCRIPTION OF THE ILLUSTRATED EMBODIMENT

Figure 1:
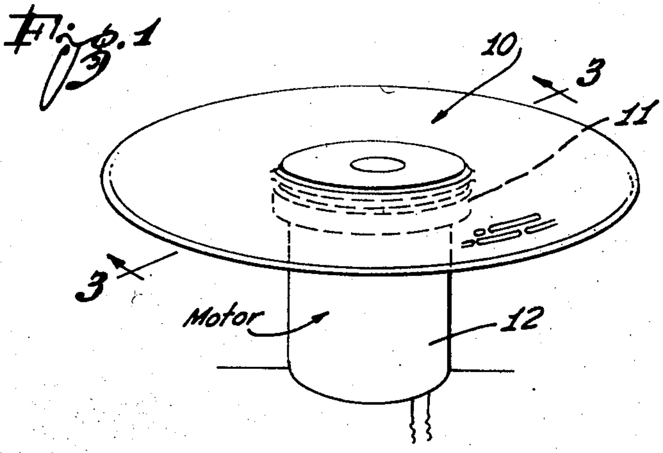
FIG. 1 is a perspective representation of a video record disc which may be constructed in accordance with the process of the present invention, the disc being shown as mounted on an appropriate turntable.

The apparatus shown in FIG. 1 includes a video record disc 10 which may be constructed in accordance with the process of the present invention, and which has video signals optically recorded thereon. The video signals are recorded on the video record disc 10, as will be described, as holes in a film on a surface of the disc, and in a recording track which extends as a micro-spiral from the outer periphery of the disc towards its center. The spiral recording track on the disc 10 may have a width, for example, of the order of 1 micron, and the spacing between adjacent convolutions of the spiral may also be of the order of 1 micron.

Figure 2:
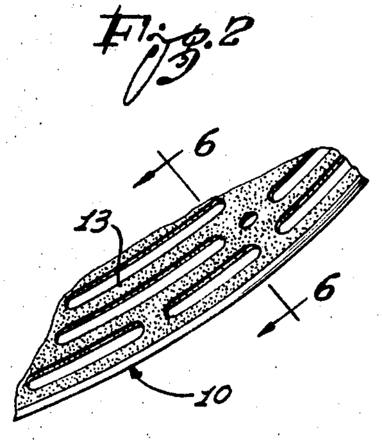
FIG. 2 is a fragmentary representation of the video record disc shown in FIG. 1, on an enlarged scale.

As mentioned above, and as shown in the enlarged representation of FIG. 2, the recordings on the video record disc are in the form of transparent holes or depressions having individual lengths which vary in accordance with the variations in the recorded video signals. The video recording disc 10 is supported on a turntable 11 which, in turn, is rotatably driven by an electric motor 12. The motor may rotate the turntable at a relatively high speed, for example, in the range of 900–3600 r.p.m.

Figure 3:
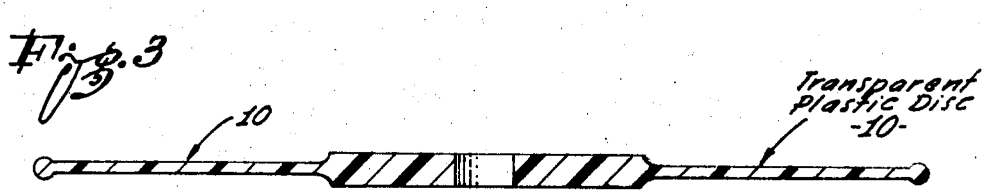
FIG. 3 is a side section of the video record disc of FIG. 1, taken essentially along the line 3—3 of FIG. 1.

The video record disc may have a cross sectional configuration as shown, for example, in FIG. 3. A metallic deposit or coating is placed over portions of the upper surface of the disc, as designated 13 in FIG. 2, so as to provide the transparent holes mentioned above. When formed by the process of the present invention, the video record disc 10 has a structure as shown in enlarged sectional view of FIG. 4, as will be described.

Figure 4:
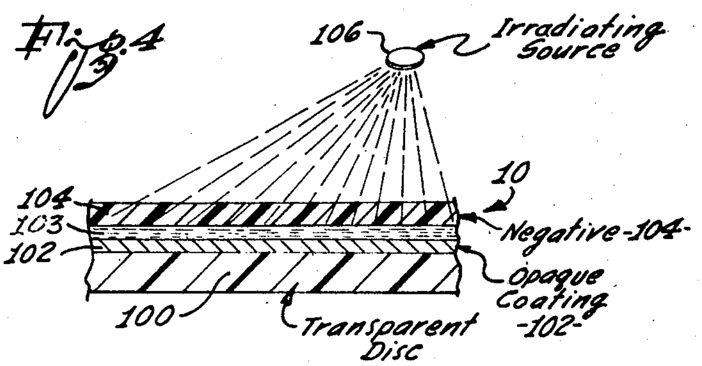
FIGS. 4–6 are sections of the video record disc shown in FIG. 2, in its various stages of production by the process of the invention; the latter FIG. 6 being a section of the completed record, as viewed along the line 6—6 of FIG. 2.

That is, and as shown in FIG. 4, the video record 10 has a transparent disc base 100 formed of glass or of a suitable transparent plastic material. A surface of the base 10 is then coated with an appropriate opaque coating 102, such as copper. The desired hole pattern is produced in the coating 102 by a photo-print process through an appropriate negative mask 104. However, the usual present day optically produced photo prints do not have the desired resolution to print the holes required for the purposes of the invention, which are in the one-micron range. This is because of emulsion thickness, scattering problems, light wave-length, and other difficulties.

Figure 5:
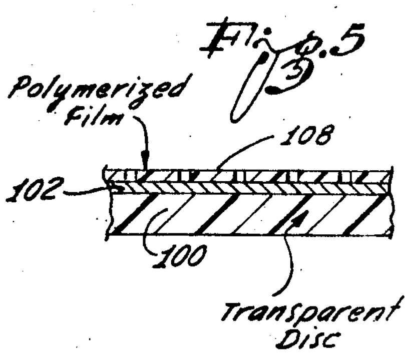

The aforesaid difficulties are overcome, as indicated above, by exposing the coated disc 100 to a monomer vapor 103, and by irradiating the vapor with an appropriate electromagnetic radiation such as, for example, X-rays or ultraviolet rays from a source 106 shown in FIG. 4. The coating 102 is exposed to the polymerizing rays from the source 106 through the negative 104. This results in the deposit of a polymerized layer 108 over the coating 102 except where the holes of the aforesaid hole pattern occur (FIG. 5).

Figure 6:
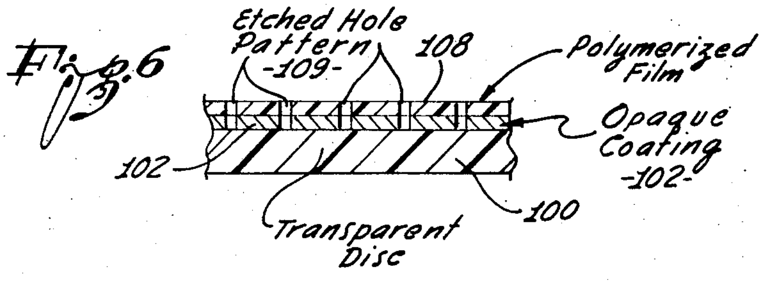

The portions of the coating 102 which are not exposed through the hole pattern of the negative 104 may then be etched away by chlorine gas, for example. This results in the desired transparent positive hole pattern 109, as shown in FIG. 6, extending through the polymerized coating 108 and through the opaque coating 102. The hole pattern 109 extends in the aforesaid micro-spiral recording track, with the holes having different lengths representative of the video recordings.

As mentioned above, the some process may be applied to the other side of the disc 100 for two-sided recordings, such as described in the copending application Ser. No. 627,701 referred to above.

For protection purposes, the polymerized film 102 may be covered with a tranparent plastic film of the same coefficient of refraction as the disc 100, as likewise described in the copending application Ser. No. 627,701.

The invention provides, therefore, an improved simplified process whereby video disc records may be produced having video signals recordings on one or both surfaces with high resolution, the process being capable of duplicating a negative into a multiplicity of video disc records, quickly and conveniently, and on a mass production basis.

While various embodiments of the process have been suggested, it will be appreciated that others may be used. The following claims are intended to cover the process with the scope intended to embody all equivalents falling within the invention.

What is claimed is:

1. A process for forming a disc record having video information optically recorded thereon which comprises the steps of
- providing a transparent disc base;
- coating a surface of the disc base with an opaque coating;
- subjecting the coated surface of the disc base to the vapor of a selected monomer vapor, said monomer vapor being adapted to deposit in a thin polymerized film upon a surface when polymerized by photon radiation;
- providing a mask having a predetermined pattern of opacity to photon radiation;
- irradiating said vapor through said negative with photon radiation causing said vapor to polymerize on said coated surface of said disc base to form a film on said surface in the pattern established by said mask;
- and chemically etching the exposed portions of said opaque coating not covered by said polymerized film to provide a transparent pattern corresponding to said predetermined pattern.

2. The process defined in claim 1 in which said vapor is polymerized by ultra-violet radiation.

3. The process defined in claim 1 in which said vapor is polymerized by X-radiation.

4. In the process of claim 1, said monomer vapor being acrolein.

5. In the process of claim 1, said etchant being chlorine gas.

References Cited

UNITED STATES PATENTS

| | | | |
|---|---|---|---|
| 1,922,434 | 8/1933 | Gundlach | 98—38.3 |
| 3,186,884 | 6/1965 | De Haan et al. | 156—13 |
| 3,241,973 | 3/1966 | Thommes | 96—115 P |
| 3,477,932 | 11/1969 | Parts et al. | 204—159.23 |

OTHER REFERENCES

Photolithographic Masks for Integrated and Thin Film Circuitry, R. C. Ingraham, Solid State Technology, March 1965, pp. 33–41, especially p. 40.

J. STEINBERG, Primary Examiner

U.S. Cl. X.R.

117—34; 156—13